United States Patent [19]
Bolte et al.

[11] Patent Number: 5,058,760
[45] Date of Patent: Oct. 22, 1991

[54] EASY-OPEN PACKAGE AND METHOD OF MAKING SAME

[75] Inventors: Georg Bolte, Vechelde; Dieter Heinecke, Wendeburg; Günter Hexel, Braunschweig, all of Fed. Rep. of Germany

[73] Assignee: Firma Schmalbach-Lubeca Ag, Braunschweig, Fed. Rep. of Germany

[21] Appl. No.: 463,363

[22] Filed: Jan. 11, 1990

[30] Foreign Application Priority Data

Jan. 19, 1989 [DE] Fed. Rep. of Germany ....... 3901489

[51] Int. Cl.$^5$ .............................................. B65D 17/40
[52] U.S. Cl. ..................................... 220/276; 53/478; 206/628; 229/123.1; 229/123.2; 493/102
[58] Field of Search ............ 229/123.2, 123.1, 125.35; 206/633, 628; 220/276; 493/102; 53/478

[56] References Cited

U.S. PATENT DOCUMENTS

| | | |
|---|---|---|
| 3,159,303 | 12/1964 | Betner . |
| 3,550,835 | 12/1970 | Persson ........................ 2290/123.2 |
| 3,572,579 | 3/1971 | Mueller .......................... 229/123.2 |
| 4,351,473 | 9/1982 | Manizza ........................ 229/125.35 |
| 4,589,568 | 5/1986 | Ito et al. ....................... 229/125.35 |

FOREIGN PATENT DOCUMENTS

| | | | |
|---|---|---|---|
| 1094 | 3/1979 | European Pat. Off. | ......... 229/123.2 |
| 0008545 | 5/1980 | European Pat. Off. . | |

OTHER PUBLICATIONS

"Fest Verschlossen und Doch Leicht Aufziehbar", Peter Bohn; Neue Verpackung 7/78, pp. 1100, 1101 & 1102.

*Primary Examiner*—Stephen P. Garbe
*Attorney, Agent, or Firm*—Herbert Dubno; Andrew Wilford

[57] ABSTRACT

An easy-open package has a vessel forming an upwardly open compartment and having an annular rim surrounding the compartment and a foil engaging the rim of the vessel part all around the compartment, having an open tab which projects laterally past the rim, and formed with a tear line extending around the compartment except at the tab and extending around and delimiting of the tab. The tab is unitarily formed with the foil and is connected to the foil by an integral web that overlies and is bonded to the rim. The bond between the foil and the vessel is substantially weaker at the web than elsewhere.

14 Claims, 2 Drawing Sheets

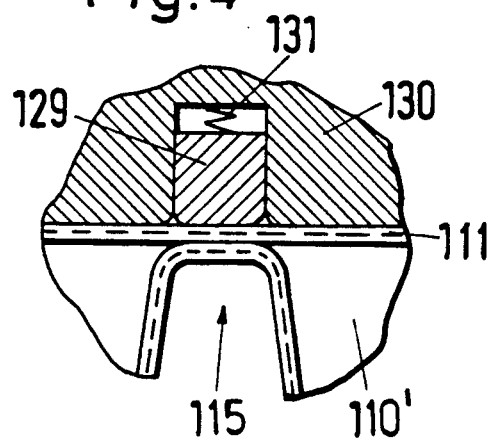
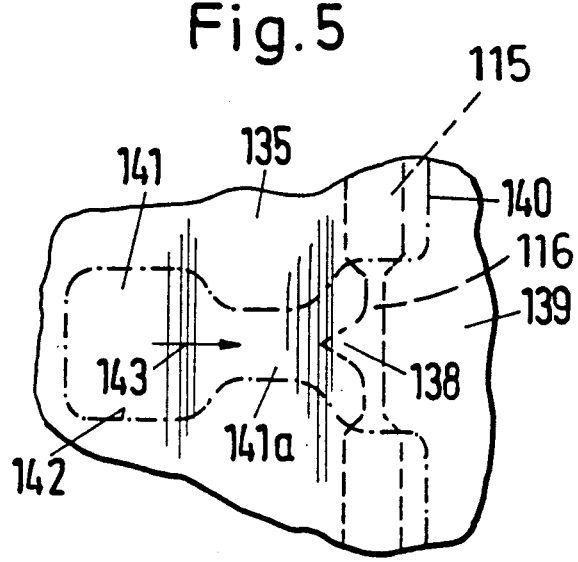
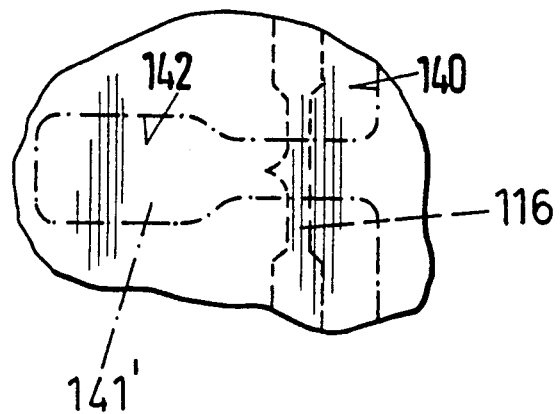

EASY-OPEN PACKAGE AND METHOD OF MAKING SAME

FIELD OF THE INVENTION

The present invention relates to an easy-open package. More particularly this invention concerns such a package and a method of making it.

BACKGROUND OF THE INVENTION

A standard easy-open package such as described in U.S. Pat. No. 3,159,303 comprises a vessel having a flat rim and a profiled or planar cover foil that is bonded to the vessel along an annular seal strip at the rim, the vessel and the foil being made of a synthetic resin, a metal, or a laminate of the two materials. The vessel and foil together form one or more compartments that can contain respective foodstuffs, although it is within the scope of this invention for other types of materials to be thus packaged.

The cover foil is formed with a tear line that extends around the compartment, just within the inner edge of its periphery and with an open or lift tab that extends over the seal strip past the rim, it being understood that the vessel can have several such compartments and the rim can be defined by a rib between two compartments and forming the border of one compartment. The tab is pulled up away from the vessel to strip that portion of the cover foil that lies inside the tear line from the package. Thus when the user lifts the tearoff tab, the bond is broken between the vessel and the tearoff tab and then the foil tears at the tear line so as to pull free from the rim and tear out the center portion of the foil to expose the contents of the compartment.

It essential that the tab be solidly connected to the tearout portion so that it can pull free of the hermetic bond on the package rim without itself ripping. Otherwise the tab will itself just be torn off in an attempt to open the package. On the other hand if the bond is made too weak the package could loose its seal which could lead to spoiling or loss of its contents. Thus the manufacturer must trade off a good seal against ease of opening.

OBJECTS OF THE INVENTION

It is therefore an object of the present invention to provide an improved easy-open package.

Another object is the provision of such an improved easy-open package which overcomes the above-given disadvantages, that is which is well sealed but which is easy to open.

A yet further object is an improved method of making such a package.

SUMMARY OF THE INVENTION

An easy-open package of conventional design has a vessel forming an upwardly open compartment and having an annular rim surrounding the compartment and a foil engaging the rim of the vessel part all around the compartment, having an open tab which projects laterally past the rim, and formed with a tear line extending around the compartment except at the tab. The tab is unitarily formed with the foil and is connected to the foil by an integral web that overlies and is bonded to the rim. According to the invention the bond between the foil and the vessel is substantially weaker at the web than elsewhere.

Thus the tab, which can project past the edge of the package or be defined by the tear line in another portion of the foil, is lifted to first separate the foil and the rim at the web, and then tear out the portion of the foil lying over the compartment within the tear line.

According to this invention the foil and rim are bonded adhesively or by a weld to each other along a seal strip of generally uniform width. The bond at the web has substantially less holding power than elsewhere. This can be achieved by making the rim at the web with a narrow portion where the seal strip is substantially narrower than elsewhere. This narrow portion can have a length at least equal to the width of the web or it can have a length at most equal to the width of the web. To facilitate stripping of the web it can be formed at the narrow portion with a point bonded to the web and directed away from the compartment.

The method according to this invention therefore comprises the step of making the bond at the web substantially weaker than elsewhere along the seal strip. This can be achieved by making the seal strip narrower and therefore of lesser contact area at the web than elsewhere or by making the weld weaker. The weld can be made weaker by forming it at the web at a lower temperature, with less pressure, or for a shorter time.

DESCRIPTION OF THE DRAWING

The above and other objects, features, and advantages will become more readily apparent from the following, reference being made to the accompanying drawing in which:

FIG. 4 is a view like FIG. 3 of another apparatus for making the package of this invention; and FIGS. 5 and 6 are top views like FIG. 2 of arrangements according to this invention.

SPECIFIC DESCRIPTION

Figure 1:
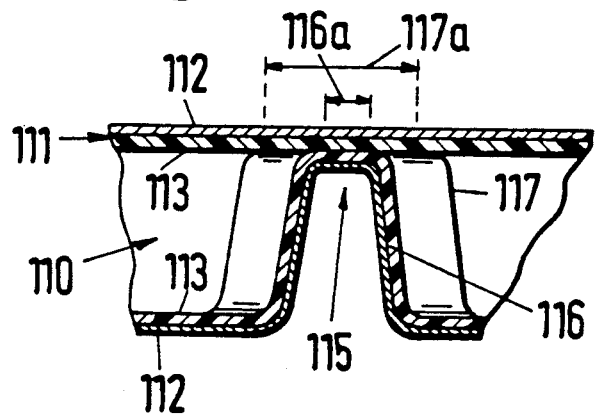
FIG. 1 is a cross-section through the package according to this invention.
Figure 2:
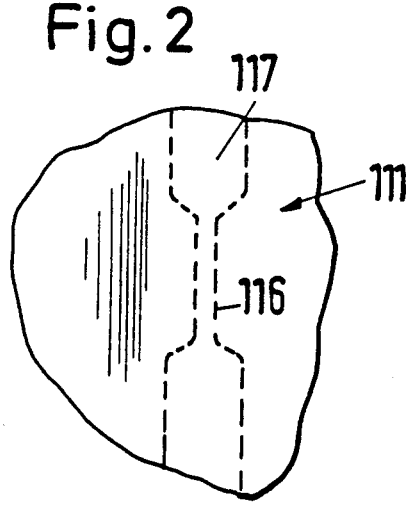
FIG. 2 is a top view of the structure of FIG. 1.

As seen in FIGS. 1 and 2 a package according to this invention has a vessel or base part 110 that is upwardly closed by a cover foil 111. Both the base 110 and foil 111 are made of an outer metallic layer 112 and a inner synthetic-resin layer 113. The base 110 is formed with a rim or rib 115 that has relatively wide portions 117 of width 117a and a relatively narrow portion 116 of width 116a. Thus the bond between the resin layers 113 will extend over a smaller area in the region 116 than in the region 117 and, as a result, will be weaker in the narrow region 116.

FIG. 5 shows how the foil 111 is formed with a tear line 140 constituted as a shallow cut in the metal layer 112 that extends around a portion 139 of the foil 111 over a compartment in part delimited by the rib 115 and that has a lobular extension 142 that defines a tab 141 connected by a web 141a to the portion 139. The web 141a has a width slightly greater than the length of the portion 116 of the rim 115, and this portion 116 is formed with a point 138 projecting away from the compartment portion 139 and bonded to the web 141a. It is also possible as shown in Fig. 6 for a web 141' to be narrower than the section 116.

In both cases the section 139 is removed by lifting the tab 141 or 141' and pulling it in the direction of arrow 143 of FIG. 5. This tears the foil 110 along the tear lines 140 and 142 after separating the tab 141 from the outside section 135 of the foil 110.

Figure 3:
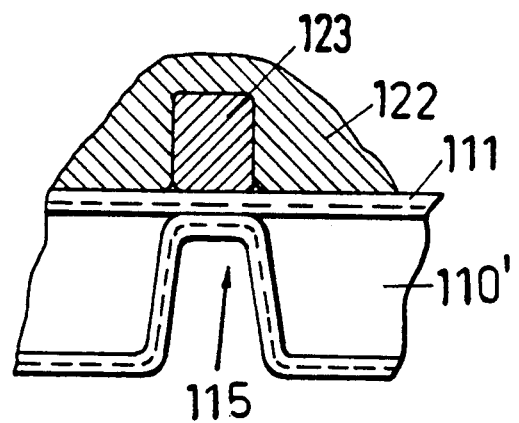
FIG. 3 is a vertical section through part of an apparatus for making the structure of FIGS. 1 and 2.

FIG. 3 shows how a vessel part 110' having a uniform-thickness rib 115 is formed with a weak-bond part. This is done by fitting a hot welding tool 122 with an insulating insert 123 that engages the foil 111 at the region corresponding to the web 141a. Thus the foil 111 will be heated to a lower temperature at this region and will not bond with such great holding power to the rim 115.

In FIG. 4 the same effect is obtained as in FIG. 3 but using a conductive insert 129 in a welding tool 130. This insert 129 is at the temperature as the tool 130 but is spring loaded by a relatively weak spring 131 so that it will bear with reduced pressure on the rim 115, thereby forming a weaker bond. To either side of the insert 129 the tool 130 is solid.

The same effect can be achieved by making the weld in two stages with the same temperature and pressure, but a shorter contact time in the web region.

I claim:

1. In an easy-open package comprising:
   a vessel forming an upwardly open compartment and having an annular rim surrounding the compartment; and
   a foil engaging the rim of the vessel part all around the compartment, having an open tab which projects laterally past the rim, and formed with a tear line extending around the compartment within the rim except at the tab and crossing the rim to both sides of the tab; the improvement wherein
   the tab is unitarily formed with the foil;
   the tab is connected to the foil by an integral web that overlies and is bonded to the rim and that is delimited by the tear line; and
   the bond between the foil and the vessel is substantially weaker at the web than elsewhere.

2. The package defined in claim 1 wherein the foil and rim engage each other along a seal strip of generally uniform width, whereby the bond at the web has substantially less holding power than elsewhere.

3. In an easy-open package comprising:
   a vessel forming an upwardly open compartment and having an annular rim surrounding the compartment; and
   a foil engaging the rim of the vessel part all around the compartment, having an open tab which projects laterally past the rim, and formed with a tear line extending around the compartment within the rim except at the tab and crossing the rim to both sides of the tab; the improvement wherein
   the tab is unitarily formed with the foil;
   the tab is connected to the foil by an integral web that overlies and is bonded to the rim and that is delimited by the tear line; and
   the foil and rim engage each other along a seal strip having at the web a narrow portion where the seal strip is substantially narrower than elsewhere.

4. The package defined in claim 3 wherein the narrow portion has a length at least equal to the width of the web.

5. The package defined in claim 3 wherein the narrow portion has a length at most equal to the width of the web.

6. The package defined in claim 3 wherein the web is formed at the narrow portion with a point bonded to the web and directed away from the compartment.

7. A method of making a package comprising:
   a vessel forming an upwardly open compartment and having an annular rim surrounding the compartment;
   a foil engaging the rim of the vessel part all around the compartment, having an open tab which projects laterally past the rim, and formed with a tear line extending around the compartment within the rim except at the tab, crossing the rim to both sides of the tab, and laterally delimiting the tab, the tab being unitarily formed with the foil and being connected to the foil by an integral web that overlies and is bonded to the rim; and
   a bond extending along a seal strip between the foil and the web and extending around the rim; the method comprising the step of:
   making the bond at the web substantially weaker than elsewhere along the seal strip.

8. The package-making method defined in claim 7 wherein the bond is made weaker at the web by making the seal strip narrower and therefore of lesser contact area at the web then elsewhere.

9. The package-making method defined in claim 7 wherein the bond is a weld.

10. The package-making method defined in claim 9 wherein the weld is made weaker at the web by employing a lower welding pressure at the web than elsewhere along the seal strip.

11. The package-making method defined in claim 9 wherein the weld is made weaker at the web by employing a shorter welding time at the web than elsewhere along the seal strip.

12. The package-making method defined in claim 9 wherein the weld is made weaker at the web by employing a lower temperature at the web than elsewhere along the seal strip.

13. The package-making method defined in claim 12 wherein the weld is made by transmitting heat to the foil at the rim from a welding tool, the temperature being lower at the web by transmission from the tool to the foil and rim at the web through an intermediate welding-tool part.

14. The package-making method defined in claim 7, further comprising the step of
   forming the rim with a point directed away from the compartment and bonded to the web.

* * * * *